United States Patent [19]

Schlör et al.

[11] Patent Number: 4,853,087

[45] Date of Patent: Aug. 1, 1989

[54] PROCESS AND APPARATUS FOR PRODUCING A FILTER WITH MULTIPLE FOLDS

[75] Inventors: Georg Schlör, Lübeck; Gerd Pantaleon-Stemberg, Mölln, both of Fed. Rep. of Germany

[73] Assignee: Draegerwerk Aktiengesellschaft, Fed. Rep. of Germany

[21] Appl. No.: 209,844

[22] Filed: Jun. 23, 1988

Related U.S. Application Data

[62] Division of Ser. No. 53,378, May 22, 1987, Pat. No. 4,784,813.

[30] Foreign Application Priority Data

Jun. 3, 1986 [DE] Fed. Rep. of Germany ....... 3622356

[51] Int. Cl.$^4$ .............................................. D21J 3/00
[52] U.S. Cl. ................................. 162/383; 162/388; 162/389; 162/393; 162/394; 162/395; 162/396; 162/399; 425/84; 425/85
[58] Field of Search ............... 162/383, 382, 388, 389, 162/393, 394, 395, 396, 399; 425/84, 85; 264/86, 87, DIG. 48

[56] References Cited

U.S. PATENT DOCUMENTS

| | | | |
|---|---|---|---|
| 513,017 | 1/1894 | Howard | 162/399 X |
| 605,706 | 6/1898 | Enzinger | 162/399 X |
| 1,175,001 | 3/1916 | Mangelsdorff | 162/399 X |
| 2,079,667 | 5/1937 | Swift | 162/383 X |
| 4,753,713 | 6/1988 | Gunderson | 162/383 |

*Primary Examiner*—David L. Lacey
*Assistant Examiner*—Thi Dang
*Attorney, Agent, or Firm*—McGlew & Tuttle

[57] ABSTRACT

A process for producing a filter with multiple folds from an aqueous fiber mixture that is applied to a porous form, in which a paper-like filter mat is produced on the form under the action of pressure, and it is carried out without mechanical deformation of the rough casting. This is achieved pursuant to the invention by the fact that the aqueous fiber mixture is deposited on the porous form having the contour of the filter, from loading chambers separate from one another, and the filter is built up of adjacent fold sections in layers on the form by separate introduction of the fiber mixture to the fold sections connected to one another.

3 Claims, 1 Drawing Sheet

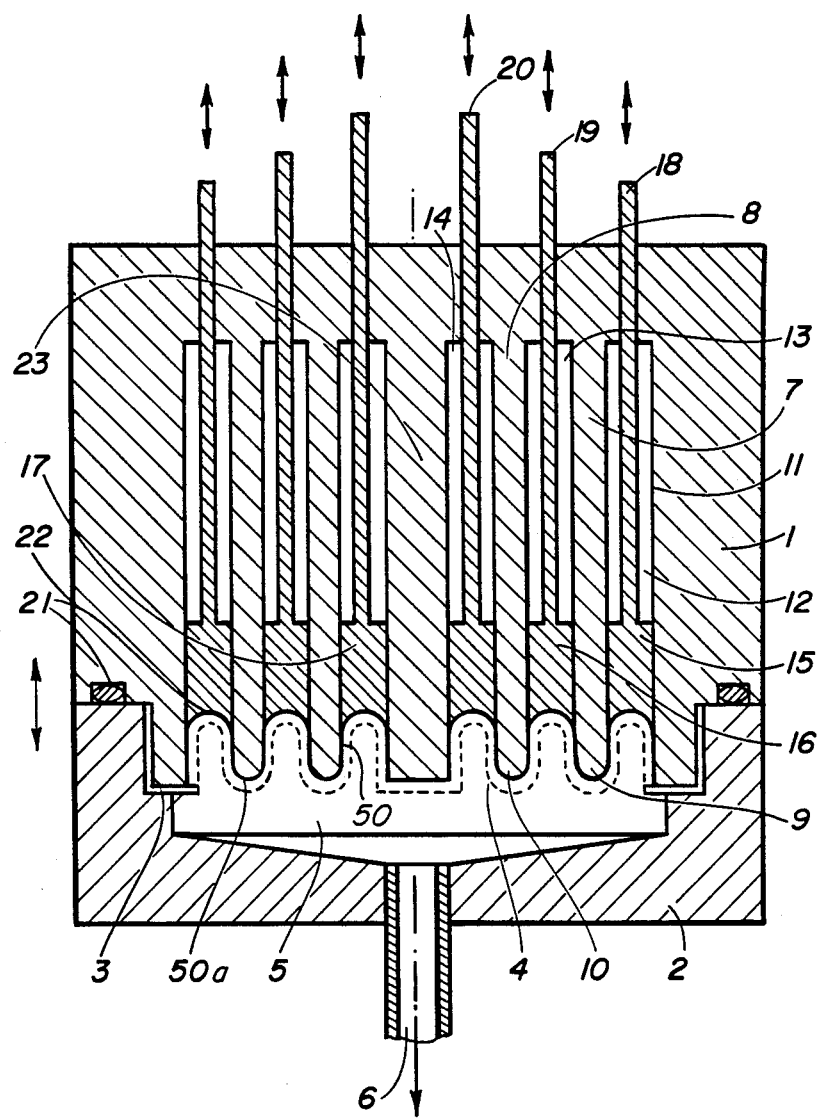

PROCESS AND APPARATUS FOR PRODUCING A FILTER WITH MULTIPLE FOLDS

This is a divisional Application application of application Ser. No. 053,378 filed May 22, 1987, now U.S. Pat. No. 4,784,813.

FIELD AND BACKGROUND OF THE INVENTION

This invention relates in general to the construction of filters and in particular to a new and useful method and apparatus for producing a filter with multiple folds.

The invention concerns a process for producing a filter with multiple folds from an aqueous fiber mixture that is applied to one side of a porous form by which a paper-like filter mat is produced on the form by the action of pressure. Features of a tool for the preferred implementation of the process are also described.

Seamless filters, for example dust filters in respirator filters, are produced according to German Pat. No. 727 678 from a truncated conical porous intermediate product that is turned up on a mold corresponding to the desired number and shape of the concentric folds. The filter tissue is severely flexed during the folding process, and under some circumstances it is predamaged to such an extent that cracking occurs. The thickness differences in different regions of the folds of the filter that form during the folding process are also a problem.

An annular filter is disclosed by DD Patent 79 that is cast in its final form from a fibrous slurry. Preparing a uniform, one-piece casting seems to be tedious.

The purpose of this invention is to develop a process for the production of substantially perfect filters with definite ranges of wall thickness and with any desired geometry of the filter and, without folding.

To solve this problem, it is proposed to deposit the aqueous fiber mixture from loading chambers separate from one another onto the porous form with the contour of the filter, and to build up the filter of adjacent fold sections in layers on the form by separate introduction of the fiber mixture to the fold sections connected to one another.

Such a production process provides the benefit that the filter is brought into its final form in situ and that the additional stresses occurring from the mechanical deformation of a blank casting are omitted. The sectional structure also avoids the drawbacks of the one-piece casting. Each fold of the filter can be supplied individually with fiber mixture as needed, and several folds can optionally be combined into a subunit consisting of several adjacent fold sections loaded at the same time.

The layer thickness of the filter can be determined suitably by repeated pumping of the fiber mixture into the loading chambers and thus by application in layers. Different layer thicknesses are also possible in the individual fold sections.

A desirable tool for producing a filter with multiple folds can be made up by inserting a porous form in the shape of the filter to be produced in a split mold in the area of the parting plane and connecting one side of it to a suction chamber, with supports being provided on the other side of the form down to the depth of the base of the fold of the filter to be produced, and with movable pump elements being present in the spaces between the supports or between a support and a wall section of the mold. The porous form is suitably a metal or plastic mold that as a number of holes in the 0.1 mm range so that a uniform separation of fibers from the fiber mixture is guaranteed over the entire area. The water separated during the deposition of the fibers flow through the holes into the suction chamber. The filter is built up in sections on the surface of the form until it comes to the end faces of the supports or of the pump elements in the end position of their advance motion. The end faces of the pump elements are chosen to conform to the desired fold shape in the fold ridge. In the same way, this also applies to the end faces of the supports reaching to the base of the fold.

Another advantage can optionally be obtained when the pump elements are connected to separate drive units and their output can be controlled separately. This permits the production of different wall thicknesses in different fold sections.

The features of the invention make possible the uniform production of filters without mechanical folding and without one-piece casting.

The widest variety of filter geometries and filter sizes can thus be produced. In addition to filter shapes with linear orientation and parallel folds. Concentric arrangements with circular folds or folds departing from circular shape with oval or polygonal shape are possible. The filters can also have reinforced folds and/or intermediate sections or folds of variable width. Clamping frames or reinforcing frames can also be formed on the filter in the same operating step. Another possible embodiment can comprise filters with the shapes of cups, truncated cones, truncated pyramids, or flat filters or filters provided with additional bent folds. The individual filter sections can also be made up of different fiber materials.

Accordingly it is an object of the invention to provide a process for producing a filter with multiple folds from an aqueous fiber mixture that is applied to one side of a porous form having the contour of the filter, comprising arranging the form in a container so that the form's separate loading chamber along the length of the form, depositing the aqueous fiber mixture on the porous form in the separate loading chambers to form a layer on the form, and continuing to deposit separate successive layers over the first layer to build up in layers of the form in each chamber forming adjacent folding sections connected to one another.

A further object of the invention is to provide a device for producing a filter which comprises a mold housing having two interengageable parts connected together along a split mold plane, a porous filter-shaped form having a shaped lateral filter fold portions arranged in the mold housing on the split mold plane and wherein the mold housing defines a suction chamber on one side of the mold form and the housing contains support structures along the mold on the opposite side which extend down to the base of the fold portions and which further includes a plurality of moveable pumped elements which are moveable toward and away from the mold form between at least some of the support structures.

A further object of the invention is to provide a device for producing a filter which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

The only FIGURE of the drawings is a sectional view of a mold constructed in accordance with the invention.

DESCRIPTION OF THE PREFERRED EMBODIMENTS

Referring to the drawings in particular the invention embodied therein comprises a device for producing a filter 50 which comprises a mold housing having upper and lower tool parts 1 and 2 which interengage on a split mold parting plane 3. A pourous filter-shaped form having a spaced lateral fold portions 4 are arranged in the mold housing on the split mold plane 3. The mold housing of comprising the two parts 1 and 2 defines a suction chamber 5 on one side of the porous mold form 4 and it has support structures 7 and 8 along the mold form 4 on the opposite side form the suction chamber 5. These support structures have end portions which extend down to the base 50a of filter fold portions 50. A plurality of moveable pump elements 15, 16 and 17 are moveable toward and away from the mold form 4 between at least some of the support structures 7 and 8.

A porous metal form 4 in the final shape of the filter to be produced is clamped into the area of the parting plane 3 of a mold composed of upper and lower tool parts 1, 2. This form 4 is connected on one side to a suction chamber 5 in a bottom section or part 2 of the tool. The suction chamber 5 is used to carry away the water discharged from the fiber mixture through the form 4, and can be connected through a connecting line 6 to a pumping device, not shown in the illustration, to produce the vacuum.

There are two concentric supports 7 and 8 with the shape of concentric annular cylinders in the upper section of the tool 1, whose end faces 9, 10 match the shape of the bases of the annular folds. The concentric supports 7, 8 define three annular loading chambers 12, 13 and 14 with respect to a central section and an inner wall surface 11 of the section of the tool 1, in which are mounted movable pump elements 15, 16 and 17 with circular annular shapes, that are connected through sliding rods 18, 19 and 20 to drive elements, (not shown) which are in the form of hydraulic cylinders.

A gasket 21 is provided for the seal between the top section of the tool 1 and the bottom section of the tool 2.

In the process for producing the filter, the upper tool section 1 is raised from the lower tool section 2, and is immersed in a supply of the aqueous fiber mixture. The pump elements 15, 16 and 17 are then moved upward by the associated drive elements, and fiber mixture is drawn by suction into the individual loading chambers 12, 13 and 14.

The upper tool section 1 can then be set down on the lower tool section 2 and the suction from the suction chamber 5 can be started. At the same time, the pump elements 15, 16 and 17 are advanced to the final stop, and the filter 22 is thus built up of adjacent fold section in layers on the form 4. This production process can optionally be repeated one or more times until the finished filter is taken off.

Since the pump elements 15, 16 and 17 are individually adjustable and can be controlled individually in motion, an individual amount of pulp can be introduced to each fold and thus a corresponding wall thickness distribution can be achieved. The amount of pulp is controlled by the stroke of the pump elements.

After pumping process, the filter is present in its final shape and can be dried by means of reduced pressure that is applied from downstream. To this end, the upper tool section 1 moves away from the lower tool section 2. The annular folded filter can then be withdrawn. During the drying suction with the upper tool section 1 taken away, the loading chambers 12, 13 and 14 of this section of the tool can be loaded with aqueous fiber mixture again by immersion and suction.

What is claimed is:

1. A device for producing a filter, comprising a mold housing having two interengageable parts connectable together along a split mold plane, a porous filter form having a plurality of filter fold portions arranged along its lateral disposed in said housing on said split mold plane, said mold housing defining a suction chamber on one side of said filter fold portions, said mold housing having support structures on the opposite side of said filter fold portions from said suction chamber which have end portions extending down to the base of said filter fold portions, a plurality of movable pump elements, and wherein each of said pump elements is arranged over each of said fold portion and positned between said support structures so as to be movable toward and away from said porous filter form between at least some of said support structures.

2. A device according to claim 1 wherein said pump elements have ends extending out of said housing so as to be controlled separately.

3. A device according to claim 1 wherein said pump elements and said support structures are concentrically arranged in the mold housing.

* * * * *